US005304271A

United States Patent [19]

Gusakov

[11] Patent Number: 5,304,271

[45] Date of Patent: Apr. 19, 1994

[54] METHOD OF MAKING A FLUID CUSHION

[76] Inventor: Ignaty Gusakov, 1361 Underhill Rd., East Aurora, N.Y. 14052

[21] Appl. No.: 53,751

[22] Filed: Apr. 29, 1993

Related U.S. Application Data

[62] Division of Ser. No. 863,923, Apr. 6, 1992, Pat. No. 5,243,722.

[51] Int. Cl.[5] ........................ B32B 31/04; A47C 27/08

[52] U.S. Cl. .................................... 156/145; 156/147; 156/290; 156/292; 5/449; 5/455

[58] Field of Search ............... 156/145, 147, 156, 197, 156/290, 292, 209; 5/449, 455; 428/178, 304.4, 179

[56] References Cited

U.S. PATENT DOCUMENTS

| | | | |
|---|---|---|---|
| 1,553,554 | 9/1925 | Roberts | 156/145 |
| 1,920,961 | 8/1933 | Anderson | 156/292 |
| 1,970,803 | 8/1934 | Johnson | 156/145 |
| 2,522,079 | 9/1950 | Winstead | 156/145 |
| 3,523,055 | 8/1970 | Lemelson | 156/156 |
| 4,169,002 | 9/1979 | Larson | 156/145 |
| 4,547,919 | 10/1985 | Wang | 5/455 |
| 4,724,560 | 2/1988 | Christie | 5/455 |
| 4,818,324 | 4/1989 | David | 156/292 |
| 5,044,030 | 9/1991 | Balaton | 5/455 |
| 5,143,775 | 9/1992 | Olsson et al. | 156/145 |

FOREIGN PATENT DOCUMENTS

| | | | |
|---|---|---|---|
| 604506 | 9/1960 | Canada | 156/290 |

*Primary Examiner*—Michael W. Ball
*Assistant Examiner*—Robert W. Robey
*Attorney, Agent, or Firm*—Jim Zegeer

[57] ABSTRACT

A fluid cushion is comprised of a top material layer having a first preformed cell pattern formed therein, and first seal lines pattern between cells, respectively, and a bottom material layer having a second preformed cell pattern formed therein. The second preformed pattern is congruent and complementary to the first preformed cell pattern and has a seal line matching the first seal lines, respectively. A first middle material layer has a third preformed cell pattern formed therein, with second seal lines between cells, respectively, the cells in the third preformed cell pattern being a fraction of the size of cells in the first preformed pattern. A second middle material layer has a fourth preformed cell pattern which is congruent and complementary to the third preformed cell pattern and has seal lines between cells matching and joined to the second seal lines to form small center cells, respectively, there being a cluster of small cells bounded by the larger outer cells. A fluid medium is confined in said cells, respectively, the top material layer and the bottom material layer being joined to the first and second middle material layers, respectively, along the first seal lines. Fluid flow passages are formed between selected ones of the small center cells to permit fluid to flow laterally in a common plane for the small center cells formed between said first and second middle layers.

4 Claims, 7 Drawing Sheets

METHOD OF MAKING A FLUID CUSHION

This is a divisional of application Ser. No. 863,923, filed Apr. 6, 1992 now U.S. Pat. No. 5,243,722.

This invention relates to cushions containing fluids that are used in connection with chairs, wheelchairs, seats, beds or other surfaces upon which a human or animal body would rest. Specifically, the cushion represented by this invention has a multiplicity of sealed chambers or cells containing a fluid medium such as air, water, gel or foam as well as a means to allow reduction of mechanical pressure on the body's tissue in areas where bony prominences exist.

Persons who spend a great amount of time lying in bed or sitting in chairs are prone to experience feelings of discomfort from local mechanical pressure on tissue of the body. In addition, these persons are at risk of developing tissue damage called pressure sores, bed sores, pressure ulcers or decubitus ulcers. Pressure sores are a major medical problem among patients and one that is very expensive and painful to treat. It is generally accepted that a major contributor to the development of pressure sores is sustained mechanical pressure on tissue of a person. The most acute pressure sores seem to develop over bony prominences in sites such as the greater trochanter, sacrum, malleolus, heels, scapula and ischium.

An accepted solution to the problem that is identified as pressure sores is to reduce mechanical surface forces over a unit of contact area, or mechanical pressure, on tissue over bony prominences. A variety of mechanical devices is used for this purpose such as foam pads of various thicknesses, convoluted foam pads, gel pads, static air cushions, cyclically pressurized air cushions and water mattresses. These devices attempt to distribute the weight of a supported person such that no points of high mechanical pressure will exist over bony prominences. All of the foregoing devices appear to succeed in reducing tissue pressure to varying degrees but such devices have also met with commercial dissatisfaction as result of certain shortcomings. For example, foam pads are easy to use but thin foam pads to not adequately relive tissue pressure over bony prominences. Thick foam pads can provide adequate tissue pressure relief but cost is high and cleaning problems exist when the foam becomes wet or soiled. Pneumatic cushions relieve tissue pressure adequately but require pump hardware to provide air to the cushions which adds to cost and complicates use. If pneumatic cushions are punctured, they become ineffective from a loss of air unless the pump can compensate for cushion air leaks. Static air cushions become ineffective when punctured as do water cushions and mattresses. Also, water mattresses do riot reduce tissue pressure as effectively as air cushions do. Because of the structure of most products, there is less film deflection under bony prominences in water than in air cushions.

The pneumatic cushion of U.S. Pat. No. 4,860,397 by Gusakov addresses the problem of punctures. Being multicelled in construction with sealed compartments, if one cell is punctured, the cushion will not fail catastrophically, that is, go completely flat, and still be able to perform its intended functions. This cushion design, however, has a structure that is very difficult to manufacture in production by conventional assembly means. The common methods used to assemble film structures like cushions depend on heat sealing. Direct heat sealing is used for films made of polyethylene, EVA, EMA and polyurethane. RF of dielectric heating is used for films made from PVC and polyurethane. These are common plastic film materials that are used for air inflated cushions. In order to create a heat seal between two layers of plastic film, with adequate strength, three variables must be controlled. These are: temperature of the material being sealed, length of time of heat application and mechanical force on the heated material which is also sometimes referred to as die pressure. In the structure of the pneumatic cushion of U.S. Pat. No. 4,860,397, some of the seals must be made between the inner film layer and one of the outer layers without interfering with the opposite outer layer. This structure does not allow the application of back-up pressure or reaction force to the surface being sealed without applying such a force through a preinflated cell. There is no known practical or commercial method in the prior art that would facilitate such a heat sealing process for production purposes.

The present invention contains a unique structure that can be fabricated by commercial heat sealing processes, adhesive or other known assembly methods while providing means for reducing tissue pressure and for prevention of a catastrophic failure of the cushion when punctured. Static air cushions that exist in prior art or are commercially available such as the Gaymar CC842 chair cushion and SC402 bed cushion are effective in reducing tissue pressure. Their effectiveness is related to the feature of the cushion that allows uniform air pressure equalization throughout the cushion if the cushion is deflected in one location. In other words, these cushions have effectively one air chamber and air is free to flow to any location inside of the cushion and thus equalizing air pressure. A weakness of these cushions is that they can deflate and become ineffective when punctured with a sharp object or a failure such as a split seal or crack in the film material should occur that results in air leakage out of the cushion. The air cushion design described in U.S. Pat. No. 4,860,397 is made up of discrete top and bottom layers of cells or compartments which allow pseudo-displacement of air from one chamber to another by deflection of bellows. The bellows connecting top cells to bottom medially offset cells isolate each cell volume from adjacent cells but cushion behavior approximates that of a cushion with a single compartment air chamber when relieving tissue pressure. This mutually offset top and bottom cell design preserves the feature of distributing air in a cushion when it is deflected locally in a way that approximates a single chamber with uniform air pressure but, as discussed above, is difficult to fabricate.

The effect of pressure equalization is accomplished with the novel structure having multiple discrete cells in this invention with the added benefit that it is feasible to manufacture this configuration with existing assembly techniques. According to this invention, congruent upper (top) and lower (bottom) large cell pairs encompass a cluster of small cells in a middle small cell assembly. The small cell assembly has selected cells interconnected with fluid flow passages so that fluid flows laterally in a common plane between small cells to distribute the pressure. At the same time, the device is more easily manufactured, at lower cost, and, at the same time, the cushion is further protected from catastrophic failure due to puncture, and even within the area of a puncture of a larger cell, the inner small cells provide cushioning. In the preferred embodiment, there are at least three layers of cells so that failure of an upper or lower cell, or both, leaves at least the inner or center cell layer to provide cushioning. Moreover, the inner or center small cells are protected from puncturing by the material forming the larger congruent upper and lower cells. Preferably, the material forming the layer congruent upper and lower cells is thicker than the material forming the inner or center small cells. The outer layers are unprotected and consequently are more prone to damage by punctures, tears and abrasion than the inner layer. The thicker the material, the less susceptible it is to such damage.

BRIEF DESCRIPTION OF THE DRAWINGS

The above and other objects, advantages, and features of the invention will become more apparent when considered with the following specification and accompanying drawings, wherein.

DETAILED DESCRIPTION OF THE INVENTION

Figure 1:
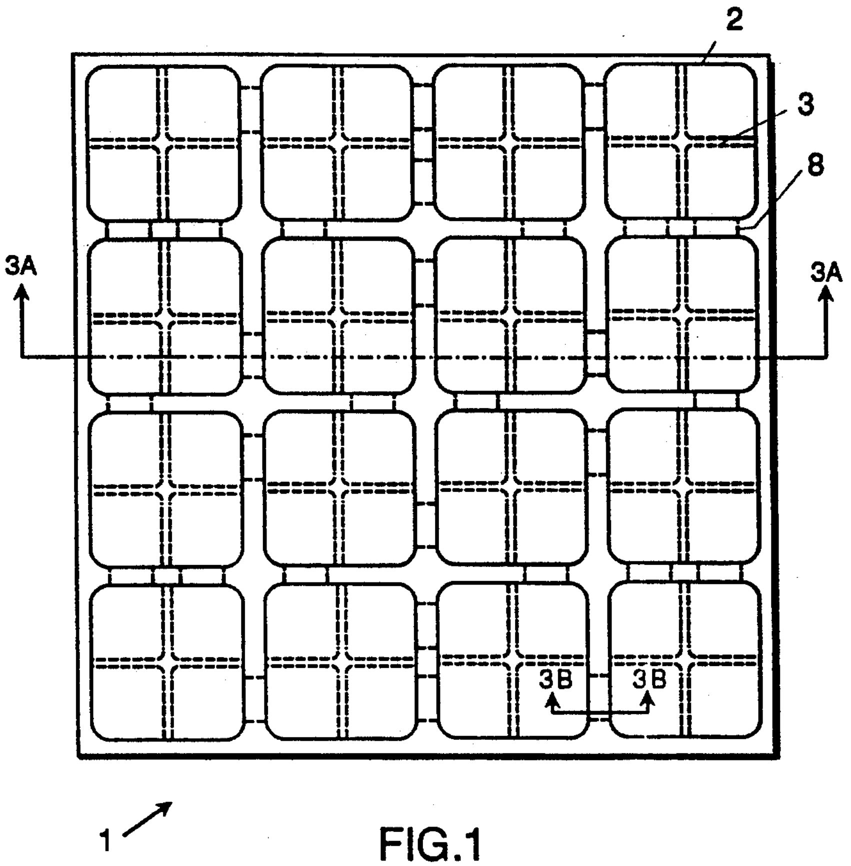
FIG. 1 is a plan view of a cushion incorporating the invention.
Figure 2:
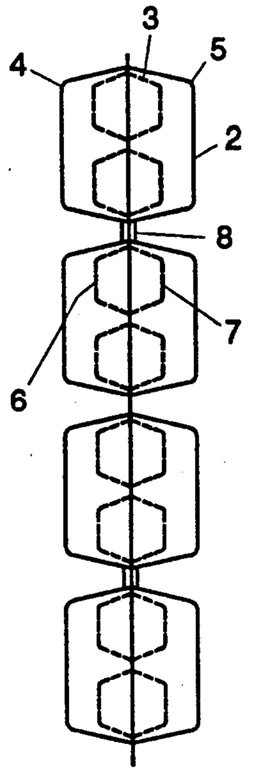
FIG. 2 is an edge view of FIG. 1.
Figure 3A:
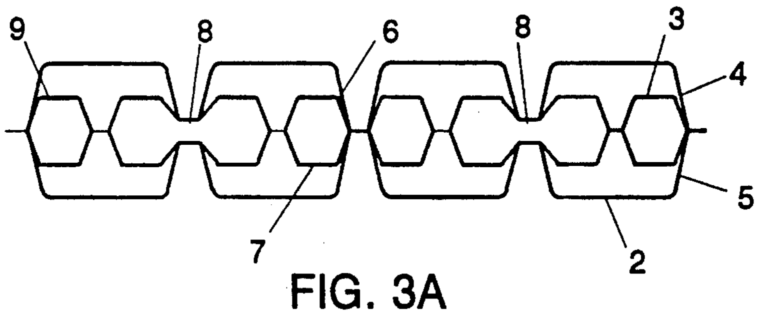
FIG. 3*a* is a sectional view along the lines A—A of FIG. 1.

FIGS. 1, 2 and 3*a* show plan, edge and cross-sectional views respective of a seat cushion version of this invention. The height or thickness of the cushion has been exaggerated in order to illustrate the cell construction more clearly. Although a seat cushion version of this is used for discussion purposes, the invention is not limited to seat cushions. This invention includes seat cushions with integral hinged back cushions (FIG. 12), bed cushions (FIG. 13), cushions for operating tables as well as other applications. All of these cushions will function in a similar manner from the standpoint of relieving tissue pressure and have basic cell constructions similar to that of the described seat cushion. However, other cushion types will have different dimensions for length, width and height and may have different cells sizes, cell shapes and cushion shapes. For example, the cushion can be in the form of a head and neck cushion (FIGS. 14 and 15) or a cell height can vary to custom fit certain anatomical shapes (FIG. 16).

In the plan view of FIG. 1, the cushion 1 is shown made up of two sets of cells. There is a plurality of large cells 2 and four small cells 3 contained in or bounded by each of the large outer cells 2. Large cells are made in two halves, a top half 4 and a bottom half 5. Both halves are shown to be identical and is preferable for ease and economy of manufacturing, but this is not a necessary condition. The small cells 3 are also made with a top half 6 and bottom half 7 and are shown to be symmetrical and of equal size. In all cases, a layer of top cells is directly positioned over a layer of bottom cells with no offset between the respective discrete cells. Some of the small cells are interconnected pneumatically by interconnecting passages 8. The cross-section A—A of FIG. 3*a* shows the large cells, small cells and the small cell interconnecting passages 8 in the cushion assembly.

Figure 9:
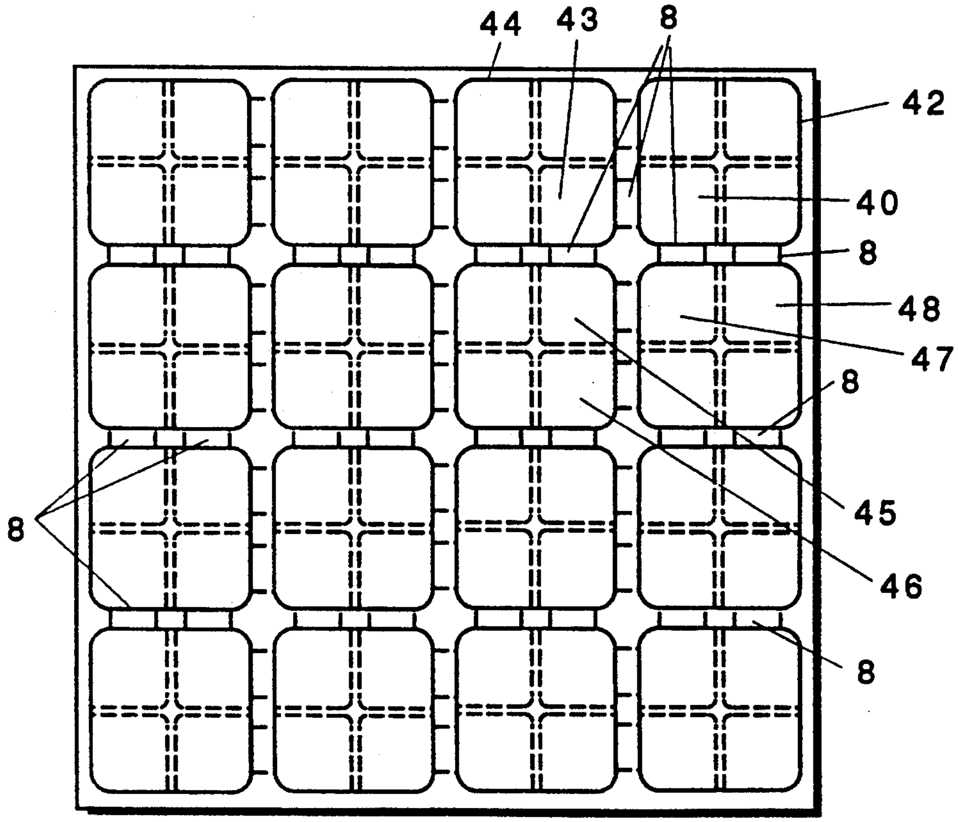
FIG. 9 is a plan view similar to the cushion of FIG. 1 wherein the pattern of interconnects between the smaller center cells is modified.

In FIG. 1, two adjacent or contiguous small cells are interconnected to allow lateral flow of trapped fluid, and the four small corner cells are not connected by interconnects to adjacent cells. In FIG. 9, four cells are interconnected, two in each cluster of four are connected to two cells in an adjacent cluster. Other small cell interconnect patterns can be easily incorporated to adapt the cushion to numerous custom designs.

The cell structures are made from formed plastic film such as polyethylene, EMA, EVA, PVC, polyurethane and other materials. The material, before forming, that is used for the outer layers of cells is thicker (typically 0.010" to 0.015" thick and material forming the inner or middle layer of small cells is about 0.005" to 0.010" thick. The reason for this is that the outer layers of cells are deeper drawn than the small cells and thinning occurs during the thermoforming process. Another reason is that the outer layer is unprotected and consequently is more prone to damage by punctures, tears and abrasion than the inner layer. Thicker material is less susceptible to such damage than thinner material. Forming is often accomplished by thermoforming the film in known ways into half cell layers resembling muffin tins (see FIGS. 8 and 10). This is done for both the large cells 2 and small center cells resulting in two identical sheets of large cell and two identical sheets of small cell structures. In FIG. 1, the dashed lines are the seal lines pattern for the small center cell structure. It may be beneficial to not have both cell halves be identical on certain occasions such as when customizing cushions for patients with specific physical conditions requiring asymmetrical cushions. For purposes of this discussion, it will be assumed that the cells will be symmetrical from top to bottom and cell sizes will be equal in both the top and bottom layers. The locations, shape and size of the areas where heat sealing will be performed must be congruent from the top to bottom halves of the respective large and small cell component assemblies.

Figure 4:
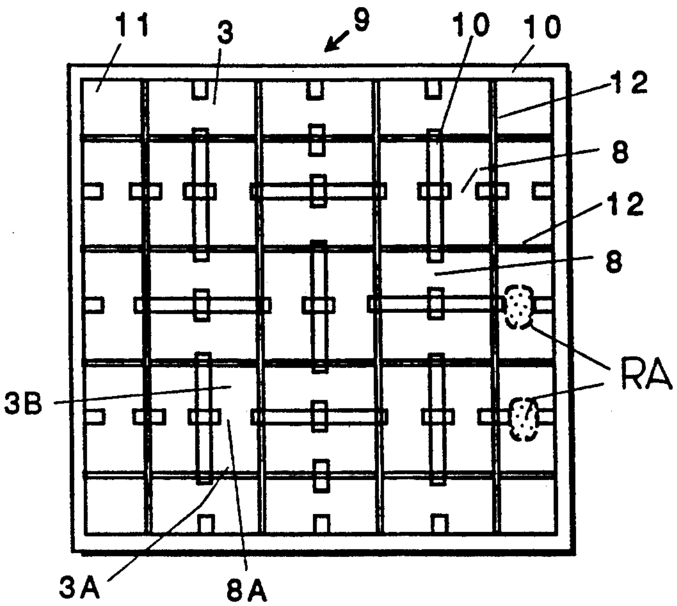
FIG. 4 is a plan view of the middle cell layer.

FIG. 4 shows a plan view of the middle cell layer or component assembly for the small cell structure 9. Sixty-four small cells 3 are shown coming out of the plane of the plan view. In a typical size, the small cells can be about 2 inches square more or less, and have a height of about 1 inch and the height of the top and bottom cells together can be about 2 inches more or less. Between cells and forming their perimeter, is a plurality of areas shown by lines as bars where the top and bottom halves of the cell assemblies are joined together as by heat sealing. With the exception of the cells in the corners 11, each cell is connected to one other cell by an air passage 8. The top and bottom layers of thermoformed film are not attached together in the passage areas 8. This will allow air to be transferred laterally from one small cell to another small cell in the plane of cells through these passages if one or the other cell is compressed. These interconnecting passages will align with corresponding areas between the large cells that are attached to the small cell assembly 9. As noted above, and as shown in FIG. 9, various small cell interconnect patterns are easily accommodated by the invention.

As an example of how this air transfer relates, when cell 3A is depressed, air transfers to cell 3B and vice versa through passage 8A. Cell 3A will be located in one large cell and cell 3B will be located in an adjacent large cell. Since air is compressed in both upper and lower congruent large cells, approximately the same amount—there is no transfer of air from an upper cell to a lower cell. Instead, the smaller middle cells are compressed proportionately and there is a lateral transfer of air through passage 8 from the small middle cells to adjacent small middle cells in the same plane and thence to the larger cells congruent to the small middle cells to which the air had been transferred. This lateral air transfer will effectively equalize large cell air pressures.

Figure 5:
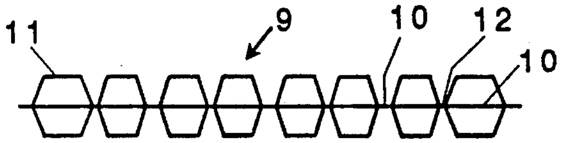
FIG. 5 is an edge view of FIG. 4.

Air is entrained in the cells at the time that the top and bottom halves of the cell assemblies are attached or heat sealed together so that the cells are somewhat slack. FIG. 5 shows an end view of the inner or small cell assembly after the two halves of the structure have been attached or sealed. Both halves are positioned in contact with each other such that the cells are held in their full outward position. That is, the film forming the cells is not allowed to collapse. This can be accomplished by letting the film hold itself freely after forming or the assemblies can be contained in forms that conform to the desired cell shapes. Once brought together, the two halves are preferably heat sealed along indicated attachment areas 10 and 12. Heat seal areas 12 are between small cells that are inside of a large cell. There are no other seals made in areas 12 which are shown to be narrower than heat seal areas 10. Heat seal areas 10 are areas where the perimeters of large cells are sealed. As a result of this assembly operation, air is captured and sealed into the cells at atmospheric pressure. If less loft or patient support is desired in all or some of the locations on the cushion, cells can be partially collapsed in those areas before sealing. This will result in less air and lower support in the corresponding locations.

Media other than air such as water, gel or foam, in addition to hybrid combinations such as air and water can be used. In most cases when air is used, the cells will be in a partially collapsed condition wherein the air at atmospheric pressure will not completely fill the available cell volume. That is, the film forming the cell will have slack which is desirable in distributing both air pressure and tissue pressure. This slack will allow air to effectively transfer from cell to cell for pressure equalization purposes. The inner cell assembly of FIGS. 4 and 5 will be attached to the top and bottom large cell components.

Figure 6:
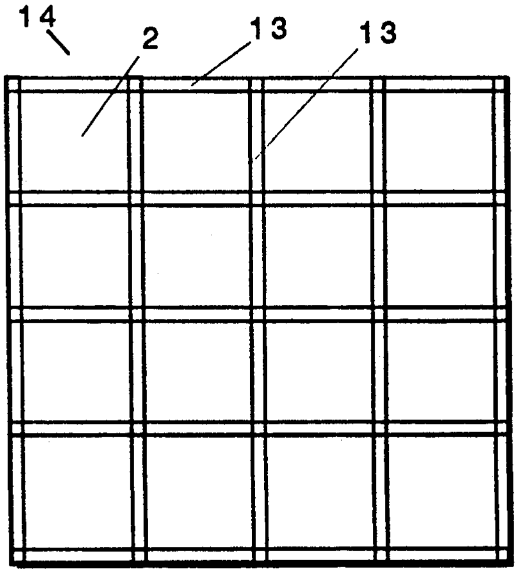
FIG. 6 shows the plan view of the top and bottom material layers.
Figure 7:
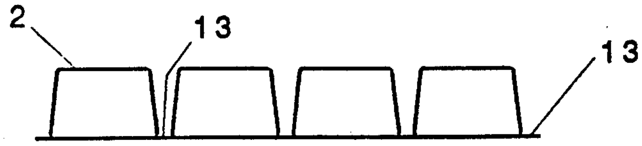
FIG. 7 is an edge view of FIG. 6.
Figure 8:
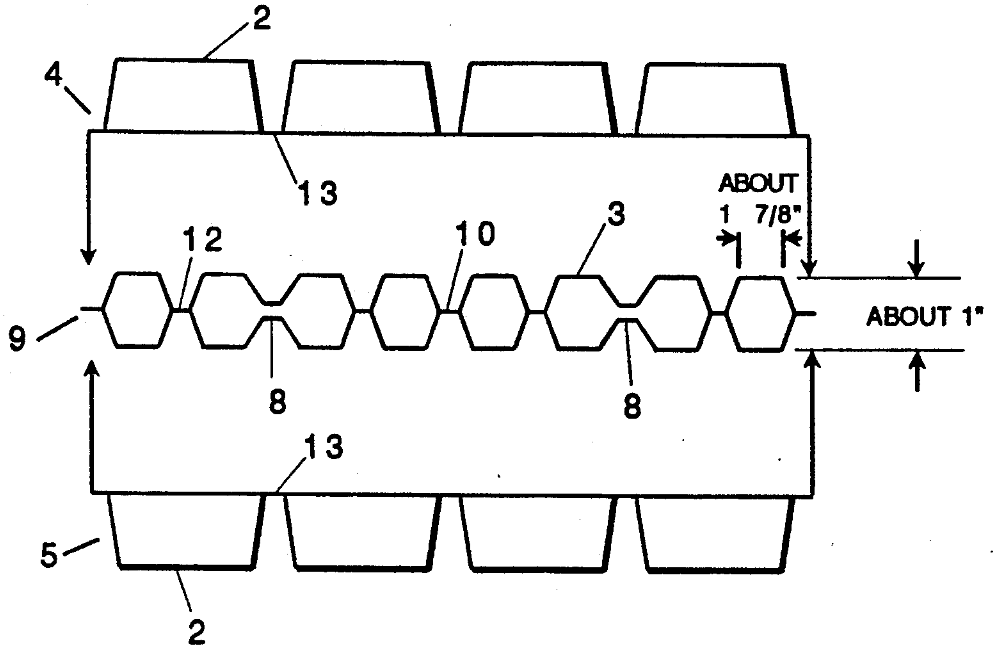
FIG. 8 illustrates how the larger celled top and bottom material layers are positioned for assembly with respect to the small cell assembly prior to sealing with selected seal lines coinciding.
Figure 10:
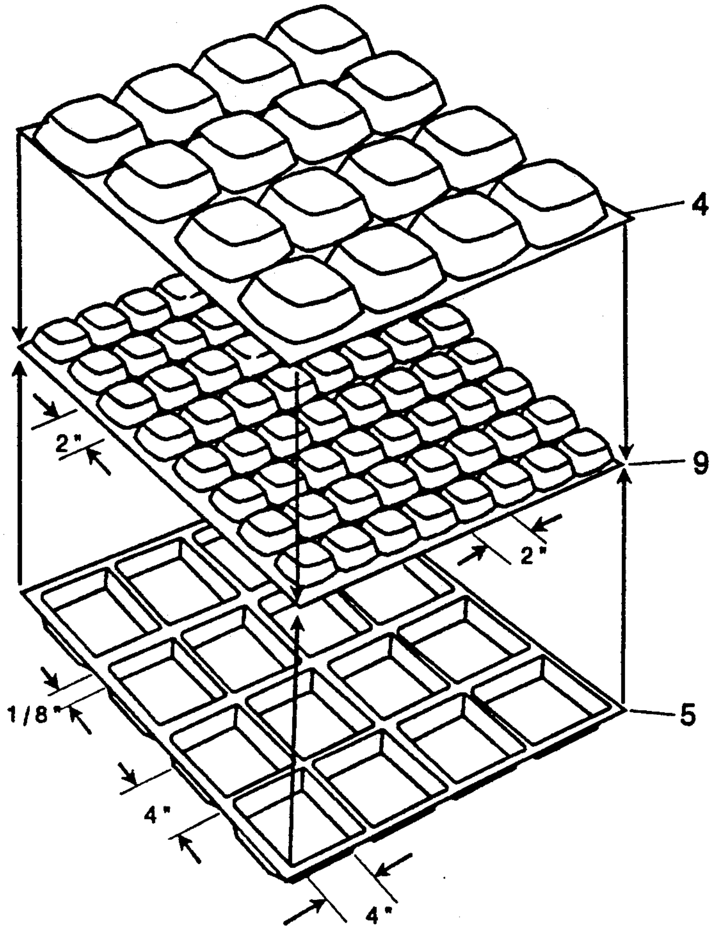
FIG. 10 shows a three-dimensional representation of the parts of the cushion shown in FIG. 8 prior to sealing.

FIGS. 6 and 7 show the large cell component in a plan and edge view respectively. One of the large cell components, say the top component 14, is shown with 16 cells 2. Each cell is separated from other cells and has around its perimeter an area 13 where attachment or sealing to the inner cell assembly 9 will be made. Sealing will be done in areas 13 of the large cell component and areas 10 of the small cell assembly 9. FIG. 8 shows how the top large cell component 4 and the bottom large cell component 5 are positioned with respect to the small cell assembly 9 prior to sealing. FIG. 3*a* shows the cross-section of both the large and small cell components and assembly respectively together after sealing. A three-dimensional representation of the parts of the cushion prior to sealing is shown in FIG. 10.

Heat sealing can be accomplished with known impulse bar heat sealers that are brought into the spaces between the cells and onto the seal areas identified as 10, 12 and 13. Application of heat under pressure then welds the materials together to complete the assembly process. The area 12 on the small cell assembly that position inside of each large cell are not welded to the large cell components. The small cells are free to move independent of the large cells. There may be performance features that are desirable with certain patients in achieving added pressure relief on tissue by cutting the web between small cells that are in a group of four inside of large cells. This will provide an additional degree of freedom of movement in the plane of the cushion that could assist in further reducing tissue pressure in a local area. This is an optional alternate construction. A short-coming of this alternate construction is that if a top large cell is punctured, both the top and corresponding bottom large cell would become deflated. In such a case, patient support from the large cells in the failed area would be lost. However, a degree of support would still be provided by the functioning small cells (four in this embodiment) contained within the large failed cells.

Figure 3B:
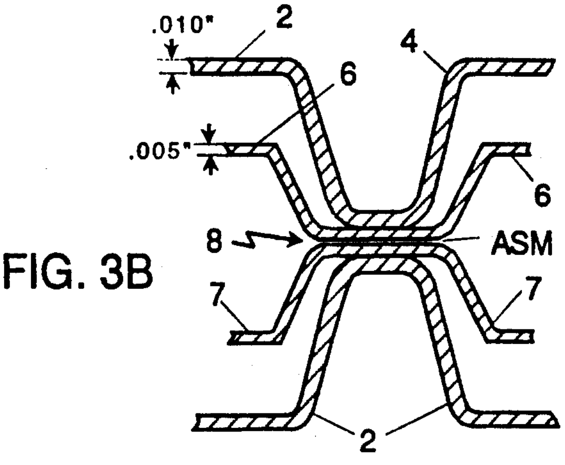
FIG. 3*b* is an enlarged sectional view along lines B—B of FIG. 1.

When the large cell components are heat sealed to the inner small cell assembly, care must be exercised to insure that the two layers of film in assembly 9 are not attached or sealed together in the passage areas 8. Also, the large cell components must be sealed to the adjacent film in the inner cell assembly over the passage areas 8, that is, top large cell film to the top film of 9 and bottom large cell component to the bottom film of small cell assembly 9. FIG. 3*b* is an enlarged sectional view showing this construction. This type of sealing can be done in several ways, one way is to insert a short ribbon of anti-seal material ASM, that will not seal to the film forming the small cell assembly, into passages 8 before sealing the top and bottom film layers of 9. Often, a material with a melt temperature that is higher than that of the film will suffice. TEFLON TM is an example of a material that will prevent sealing. It can be in tape form or sprayed, tape being preferred. Another method to prevent sealing of the two inner film layers in the passages 8 is to maintain a temperature gradient from the top or bottom film layer surface to the inside of the inner film layer such that the outside of the inner film will weld but the inner surface will not block or stick to the second inner layer. A technique from the prior art that can achieve this effect is to use a back-up platen as a companion to the sealing die that would carry heat away from the film opposite to the seal. Cooled platens have the ability to carry heat away from areas where seals are not wanted. In this way, large temperature gradients are possible in films.

Figure 11:
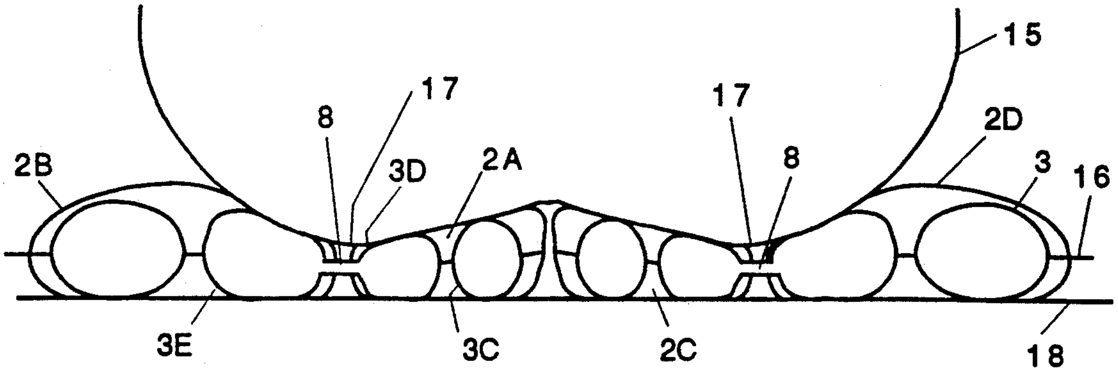
FIG. 11 illustrates a seat cushion incorporating the invention with a seated person in profile thereon.

Operation of this invention is shown in FIG. 11 as a seat cushion with air. Air is near atmospheric pressure inside of the cushion before the person is placed on it. After a person sits on the cushion, air pressure will increase in the cushion and the person will be supported. The increase in pressure inside of the cushion will be related to the amount of weight or force that the seated person applies to the cushion. FIG. 11 shows a cross-section of the cushion 16 with a seated person 15 in profile, all resting on a surface 18 such as a chair. A prominent feature of the person's anatomy such as a bony prominence 17 causes a greater deflection of the cushion than takes place in the surrounding area. Large cells 2A and 2B on the left side and 2C and 2D on the right side under the prominences 17 are deflected or compressed with cells 2A and 2C being compressed more than cells 2B and 2D, respectively. In this case, pressure distribution will be accomplished similarly on the left and right side of the cushion so the description will be confined to the left side. Air inside of the large compressed cells will be compressed and the air pressure in the large cells will increase. This causes air pressure in the small cells that are inside of the large compressed cells to increase as the film structure of the small cells is compressed by the surrounding air. When large cell 2A is compressed, small cells 3C and 3D are also compressed either because of mechanical force that is transmitted from the person 15 through the collapsing large cell structure 2A or the increase in air pressure inside of large cell 2A. In most cases, both effects will contribute to the increase in air pressure inside of the small cells. When small cell 3C is compressed, air pressure in the cell connected to cell 3C will equalize. The connected cell is not shown in FIG. 11 since it is located either into or out of the plane of the cross-section. Cell 3D is shown connected to cell 3E in the adjacent large cell 2B through passage 8. In this example, when pressure in small cell 3D is increased, air will flow through passage 8 to cell 3E until pressure is equalized and the flexible film of cell 3E expands the volume of cell 3E. The increased pressure in cell 3E will cause it to expand, increasing its volume and in turn, cause the pressure in large cell 2B to increase. This pseudo-propagation of pressure away from the point of major deflection 17 will tend to equalize pressure throughout the cushion to some degree, diminishing in magnitude with distance from the point of deflection. This equalization of pressure will tend to provide more uniform support of the person over the entire contact area between the person and cushion. If a means to propagate this pressure away from the area of predominant cushion deflection did not exist, high tissue pressure would be experienced in areas where prominences 17 occur. This would be the case if cushions were made with discrete cells like 2 with no means to laterally propagate local high air pressures as is accomplished by the inner small cells 3 in this invention. In this invention, if air pressure is increased in a large cell, four small cells inside of the large cell laterally propagate the increase in pressure to four adjacent large cells. The propagation then continues in a graduated and diminished manner from the adjacent four large cells throughout the cushion by means of the corresponding small cells. In addition to serving as a means to propagate pressure equalization in the cushion across boundaries between large cells, the small cells can support the person upon the cushion directly through deflected large cells. Also, the small cells provide multiple discrete compartments for air which reduces the impact on cushion performance due to punctures or film failures. In FIG. 9, two and four small cells are provided with cell interconnect passages 8. Small cell 40 which is in the cluster bounded by large cell 42, small cell 43 which is within the cluster of small cells bounded by large cell 44, small cell 45 which is within the cluster of small cells bounded by large cell 46, and small cell 47 which is within the cluster of small cells bounded by large cell 48 are interconnected by air flow interconnects 8. In this embodiment, pairs of permetrical small cells are interconnected and the four corner small cells are, optionally, not connected.

Cushions can be customized or tailored to specific support requirements of users. Air can be added or removed when heat sealing cells in appropriate locations. This could be beneficial if the patient's anatomy is not symmetrical as a result of surgery, birth deformity or other medical conditions. Cell size and shape could also be altered to facilitate tailoring cushions for various applications. If a cushion is used as a back support device, the cell in the lumbar area of the back could be made with more air than other cells thus providing more local pressure and support in the lumber area.

When used with thicker material and various cell sizes, the inner cell structure (center cell assembly 9) can itself be employed as a pad or cushion. A benefit of such a device would be lower costs.

Figure 12:
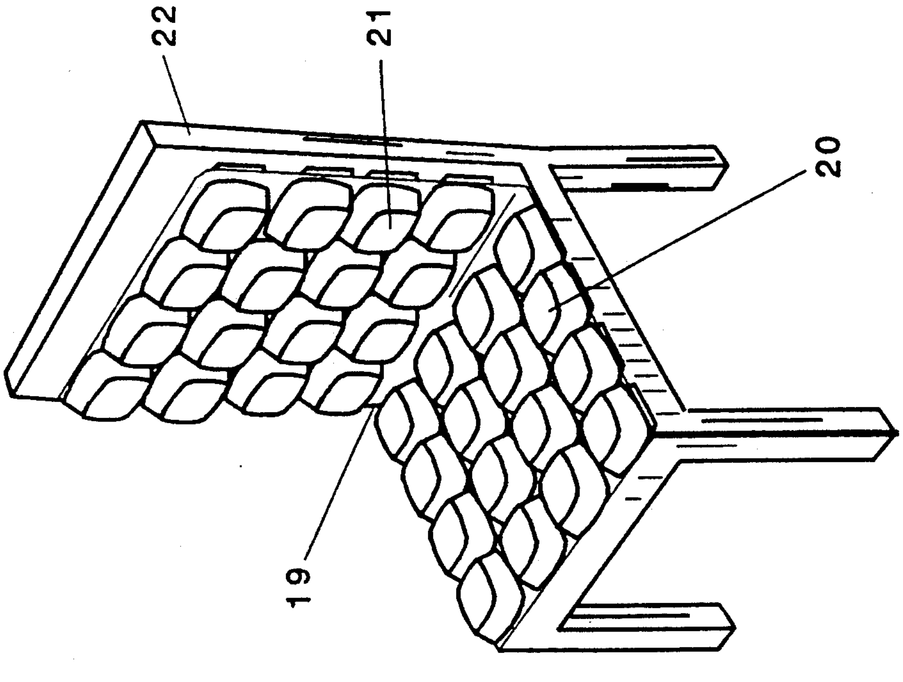
FIG. 12 shows the seat cushion with a back support.

This invention can be applied to other variations of body support devices. FIG. 12 shows a cushion 19 that has a seat portion 20 and an attached back portion 21 as an integral device. Velcro fasteners, ties, straps and the like, not shown, can be used to attach the cushion to the back of the seat or chair. Such a cushion can be installed and used on a chair 22 as shown in this figure or on car seats, wheel chairs, couches, benches and the like.

Figure 13:
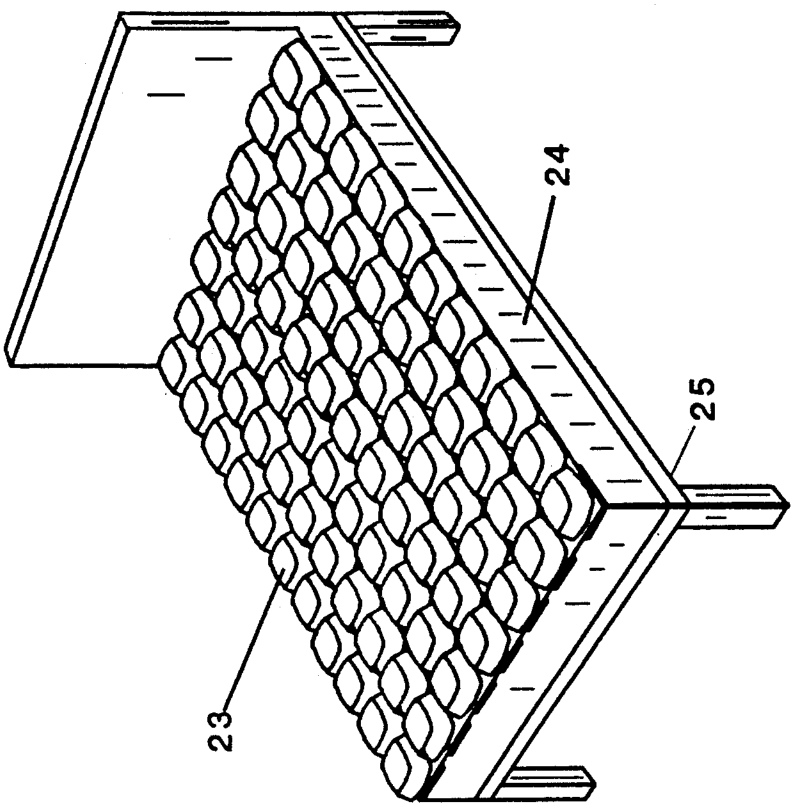
FIG. 13 shows a bed cushion incorporating the invention.

FIG. 13 shows a configuration for a bed cushion 23 that can be installed on a mattress 24 that is on a bed 25. The principle of operation and means of construction are the same for these products as they are described for the seat cushion. Bed cushions may require a cell height that is greater than is needed for seat cushions in order to account for anatomical contours or vertical displacements in bodies so that adequate support is provided. Moreover, the number of small cells in each cluster within the boundaries of the congruent top and bottom cells need not be the same; these can more or less cells in the respective clusters of adjacent congruent top and bottom cell pairs.

Figure 14:
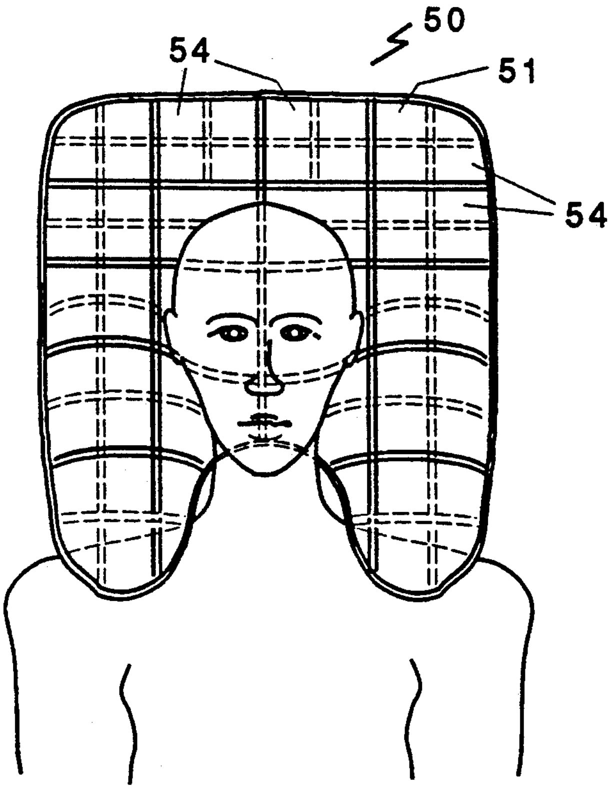
FIGS. 14 and 15 are top plan and side elevational views illustrating shape variations in the form of a neck cushion or collar.
Figure 15:
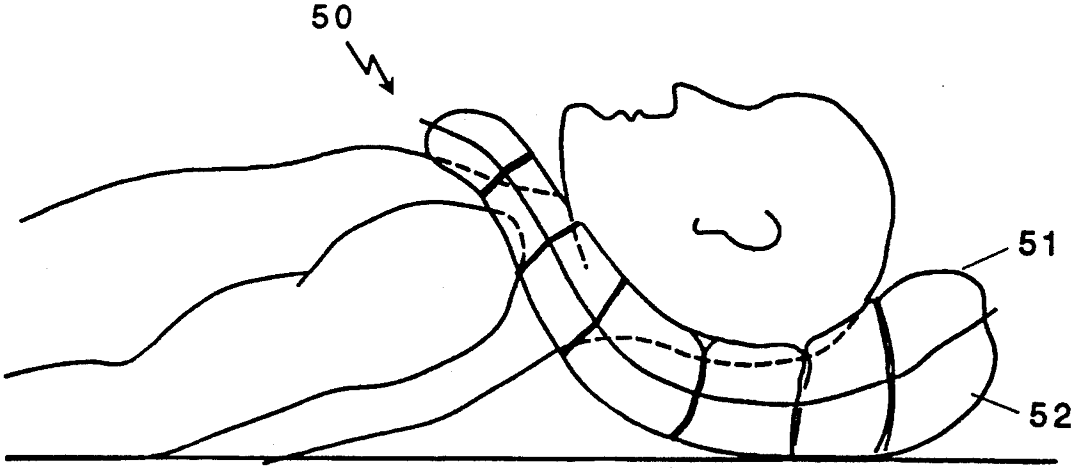
Figure 16:
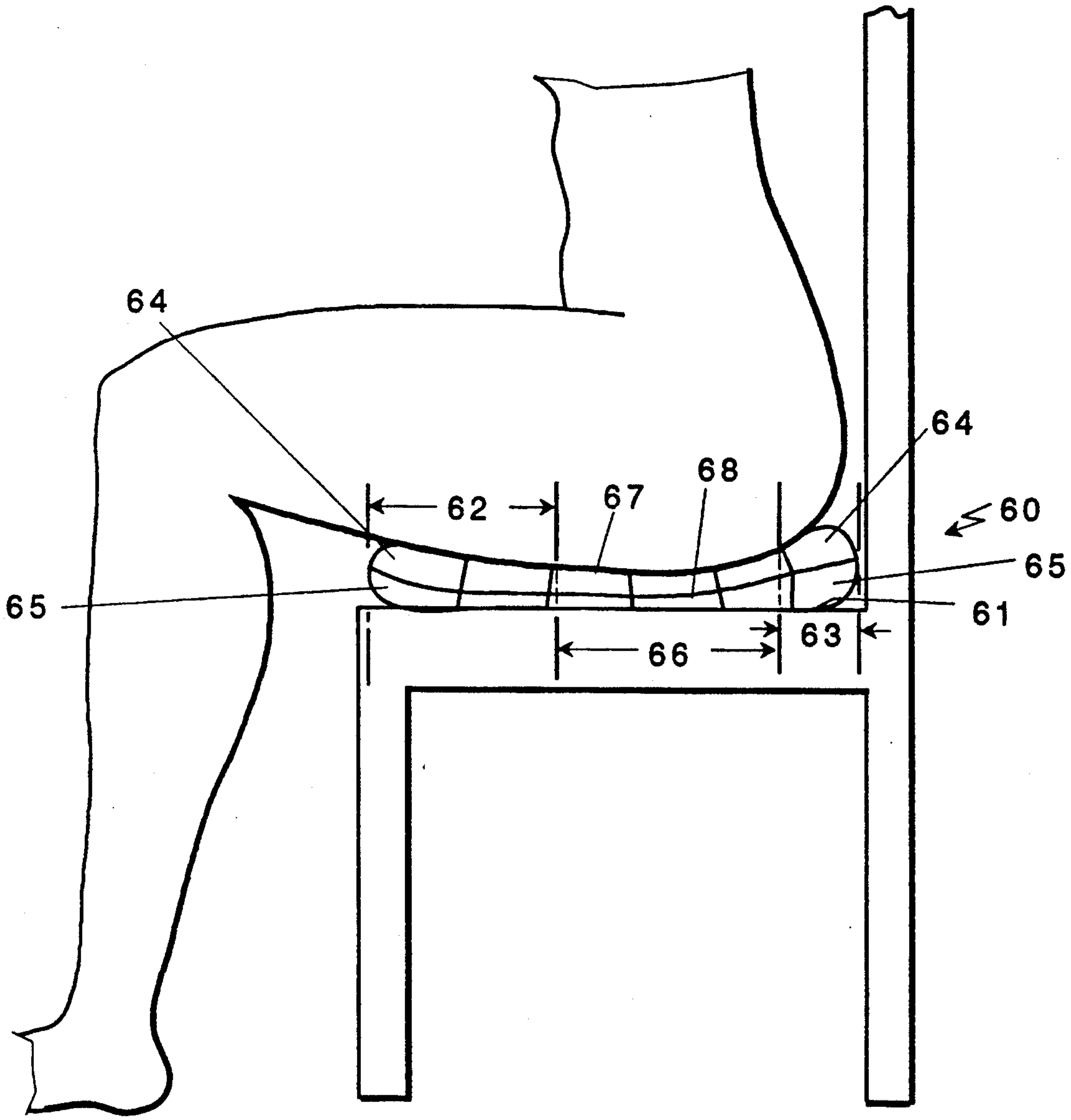
FIG. 16 is a view illustrating shape variations in the height of the cushion's large cells and used for postpartum or hemorrhoid treatment or application.

FIGS. 14 and 15 are top plan and side elevational views of a neck cushion or collar 50 incorporating the invention. This illustrates that the large top and bottom cell layers 51 and 52 and the small inner cells 54 do not have to be uniform in shape. In FIG. 16, the cushion 60 is on a chair seat 61 and has front 62 and rear 63 regions of top and bottom large cells 65 which are higher or thicker than the middle region 66 where the top 67 and bottom 68 cells are lower than the top and bottom cells in regions 62 and 63.

While preferred embodiments of the invention have been illustrated, it will be appreciated that various adaptations and modifications will be apparent to those skilled in the art and it is intended that such modifications and adaptations be encompassed within the spirit and scope of the claims.

What is claimed is:

1. A method of manufacturing a cushion comprising forming a first pair of material layers having first preformed cells therein and a first seal line pattern between cells, respectively, forming a second pair of material layers having second preformed cells therein smaller than said first preformed cells, and a second seal line pattern between cells, joining said second pair of material layers in abutting and complementary relation along said second seal line pattern to form middle cells with fluid trapped therein, and at the same time, forming cell interconnects between selected adjacent middle cells to allow trapped fluid to flow laterally in the plane of said adjacent middle cells when external pressure is applied to an interconnected cell, joining one of said first pair of material layers to one side of said middle cells along said first seal line such that a first cell therein encompasses a plurality of said middle cells and has a fluid trapped therein, and joining the other one of said first pair of material layers to the other side of said middle cells along said first seal line such that said first cells therein are congruent with said first cells in said one of said first pair of material layers and has a fluid trapped therein.

2. The method defined in claim 1 wherein said joining steps include heat sealing cell interconnects formed by including a material between said second pair of material layers at said cell interconnects which preclude said second pair of material layers being joined where said second pair of material layers abut.

3. The method defined in claim 1 wherein said first pair of material layers is joined to the respective sides of said middle cells simultaneously.

4. The method defined in claim 1 wherein said first pair of material layers is thicker than said second pair of material layers and said first preformed cells are formed by thermal drawing and are deeper than said second preformed cells.

* * * * *